(12) United States Patent
Mokrushin et al.

(10) Patent No.: US 10,531,306 B2
(45) Date of Patent: Jan. 7, 2020

(54) DYNAMIC ALLOCATION OF RADIO RESOURCES IN A WIRELESS NETWORKS

(71) Applicant: Telefonaktiebolaget LM Ericsson (publ), Stockholm (SE)

(72) Inventors: Leonid Mokrushin, Uppsala (SE); Elena Fersman, Stockholm (SE); Rafia Inam, Västerås (SE); Athanasios Karapantelakis, Stockholm (SE); Maxim Teslenko, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/738,907

(22) PCT Filed: Jul. 1, 2015

(86) PCT No.: PCT/SE2015/050771
§ 371 (c)(1),
(2) Date: Dec. 21, 2017

(87) PCT Pub. No.: WO2017/003334
PCT Pub. Date: Jan. 5, 2017

(65) Prior Publication Data
US 2018/0184301 A1  Jun. 28, 2018

(51) Int. Cl.
*H04W 72/00* (2009.01)
*H04W 16/10* (2009.01)
(Continued)

(52) U.S. Cl.
CPC ........... *H04W 16/10* (2013.01); *H04W 16/02* (2013.01); *H04W 24/08* (2013.01); *H04W 64/00* (2013.01); *H04W 72/085* (2013.01); *H04W 92/20* (2013.01)

(58) Field of Classification Search
CPC .... H04B 7/2606; H04W 36/30; H04W 36/04; H04W 16/32; H04W 16/12; H04W 16/02;
(Continued)

(56) References Cited

U.S. PATENT DOCUMENTS

2008/0137620 A1* 6/2008 Wang ................ H04W 72/0446
370/337
2009/0190541 A1* 7/2009 Abedi ................... H04W 16/10
370/329
(Continued)

FOREIGN PATENT DOCUMENTS

GB  2452167 A  2/2009
GB  2519561 A  4/2015
(Continued)

*Primary Examiner* — Dai Phuong
(74) *Attorney, Agent, or Firm* — Murphy, Bilak & Homiller, PLLC

(57) ABSTRACT

Embodiments herein relate to a method performed by a network node (100,12,14) for performing allocation of at least a part of a spectrum of radio resources to one or more radio network nodes in a wireless communication network (1). The network node (100,12,14) receives condition data from the one or more radio network nodes, wherein each condition data indicates a condition of a respective radio network node out of the one or more radio network nodes. The network node (100,12,14) performs an allocation of at least a part of the spectrum of radio resources to the one or more radio network nodes based on the received condition data. The network node (100,12,14) transmits to the one or more network nodes, data indicating the allocation of the at least a part of the spectrum of radio resources for the one or more radio network nodes.

10 Claims, 7 Drawing Sheets

(51) Int. Cl.
*H04W 16/02* (2009.01)
*H04W 24/08* (2009.01)
*H04W 64/00* (2009.01)
*H04W 72/08* (2009.01)
*H04W 92/20* (2009.01)

(58) Field of Classification Search
CPC ..... H04W 16/14; H04W 88/06; H04W 72/04; H04W 76/02; H04W 24/00; H04W 72/082; H04W 28/04
USPC ................. 455/436–439, 443–444, 450–453
See application file for complete search history.

(56) References Cited

U.S. PATENT DOCUMENTS

| | | | |
|---|---|---|---|
| 2013/0040683 A1 | 2/2013 | Siomina et al. | |
| 2013/0252625 A1 | 9/2013 | Benjebbour et al. | |
| 2014/0146704 A1* | 5/2014 | Cho | H04W 92/02 370/254 |
| 2014/0341129 A1* | 11/2014 | Zhu | H04L 5/00 370/329 |
| 2015/0237503 A1* | 8/2015 | Buddhikot | H04W 16/10 455/452.1 |
| 2015/0341854 A1* | 11/2015 | Smith | H04W 48/17 455/450 |
| 2017/0332354 A1* | 11/2017 | Chang | H04M 3/42289 |

FOREIGN PATENT DOCUMENTS

| | | | |
|---|---|---|---|
| WO | 2012037637 A1 | 3/2012 | |
| WO | 2014182118 A1 | 11/2014 | |

* cited by examiner

DYNAMIC ALLOCATION OF RADIO RESOURCES IN A WIRELESS NETWORKS

TECHNICAL FIELD

Embodiments herein relate to a network node, a second radio network node, and methods performed therein. In particular, embodiments herein relate to performing allocation of at least a part of a spectrum of radio resources to the second radio network node.

BACKGROUND

In a typical wireless communication network, wireless devices, also known as wireless communication devices, mobile stations, stations (STA) and/or user equipment (UE), communicate via a Radio Access Network (RAN) to one or more core networks (CN) belonging to different network operators. The RAN covers a geographical area which is divided into areas or cell areas, with each area or cell area being served by an access node e.g., a Wi-Fi access point or a radio base station (RBS), which in some networks may also be called, for example, a "NodeB" or "eNodeB". The area or cell area is a geographical area where radio coverage is provided by the access node. The access node communicates over an air interface operating on radio frequencies with the wireless device within range of the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of an RNC are distributed between the radio base stations, e.g. eNodeBs in LTE, and the core network. As such, the Radio Access Network (RAN) of an EPS has an essentially "flat" architecture comprising radio base stations connected directly to one or more core networks, i.e. they are not connected to RNCs.

Most current Wi-Fi deployments, also referred to as Wireless Local Area Network (WLAN) deployments, are wireless communication networks that are totally separate from telecommunication networks, and can be seen as a non-integrated network from the wireless device perspective. Most operating systems (OS) for wireless devices support a simple Wi-Fi offloading mechanism where a wireless device immediately switches all its Internet Protocol (IP) traffic to a Wi-Fi network upon a detection of a suitable network with a received signal strength above a certain level. Henceforth, the decision to offload to a Wi-Fi network or not is referred to as access selection strategy and the term "W-Fi-if-coverage" is used to refer to the aforementioned strategy of selecting Wi-Fi whenever such a network is detected.

In dense wireless environments, e.g. in cities, radio access nodes such as IEEE 802.11.x access points, IEEE 802.15.4.x wireless gateways, as well as upcoming radio base stations, use wireless channels independently of each other in a same radio spectrum band. As a result, wireless devices or STAs that associate with these radio access nodes experience interference from wireless devices associated with other radio access nodes in proximity. This results in a reduced performance of the wireless communication network.

SUMMARY

An object of embodiments herein is to provide a mechanism that improves performance of the wireless communication network.

According to an aspect the object is achieved by a method performed by a network node for performing allocation of at least a part of a spectrum of radio resources to one or more radio network nodes in a wireless communication network. The network node receives condition data from the one or more radio network nodes, wherein each condition data indicates a condition of a respective radio network node out of the one or more radio network nodes. The network node performs an allocation of at least a part of the spectrum of radio resources to the one or more radio network nodes based on the received condition data. The network node transmits to the one or more radio network nodes, data indicating the allocation of the at least a part of the spectrum of radio resources for the one or more radio network nodes.

According to an additional aspect the object is achieved by a method performed by a second radio network node for receiving an allocation of at least a part of a spectrum of radio resources from a network node in a wireless communication network. The second radio network node measures a condition at the second radio network node. The second radio network node transmits condition data to the network node, wherein the condition data indicates the measured condition of the second radio network node. The second radio network node receives from the network node, data indicating the allocation of the at least a part of the spectrum of radio resources for the radio network node.

The object is achieved by providing a network node for performing allocation of at least a part of a spectrum of radio resources to one or more radio network nodes in a wireless communication network. The network node being configured to receive condition data from the one or more radio network nodes, wherein each condition data indicates a condition of a respective radio network node out of the one or more radio network nodes. The network node being configured to perform an allocation of at least a part of the spectrum of radio resources to the one or more radio network nodes based on the received condition data. The network node being configured to transmit to the one or more radio network nodes, data indicating the allocation of the at least a part of the spectrum of radio resources for the one or more radio network nodes.

The object is achieved by providing a second radio network node for receiving an allocation of at least a part of a spectrum of radio resources from a network node in a wireless communication network. The second radio network node being configured to measure a condition at the second radio network node. The second radio network node being configured to transmit condition data to the network node, wherein the condition data indicates the measured condition of the second radio network node. The second radio network node being configured to receive from the network node, data indicating the allocation of the at least a part of the spectrum of radio resources for the radio network node.

An advantage of embodiments of the claimed solution, is that embodiments enable a higher throughput for associated wireless devices as embodiments herein provide a smarter allocation of the spectrum of radio resources to radio network stations as the network node performs the allocation based on the received condition data from one or more radio network nodes. This results in an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
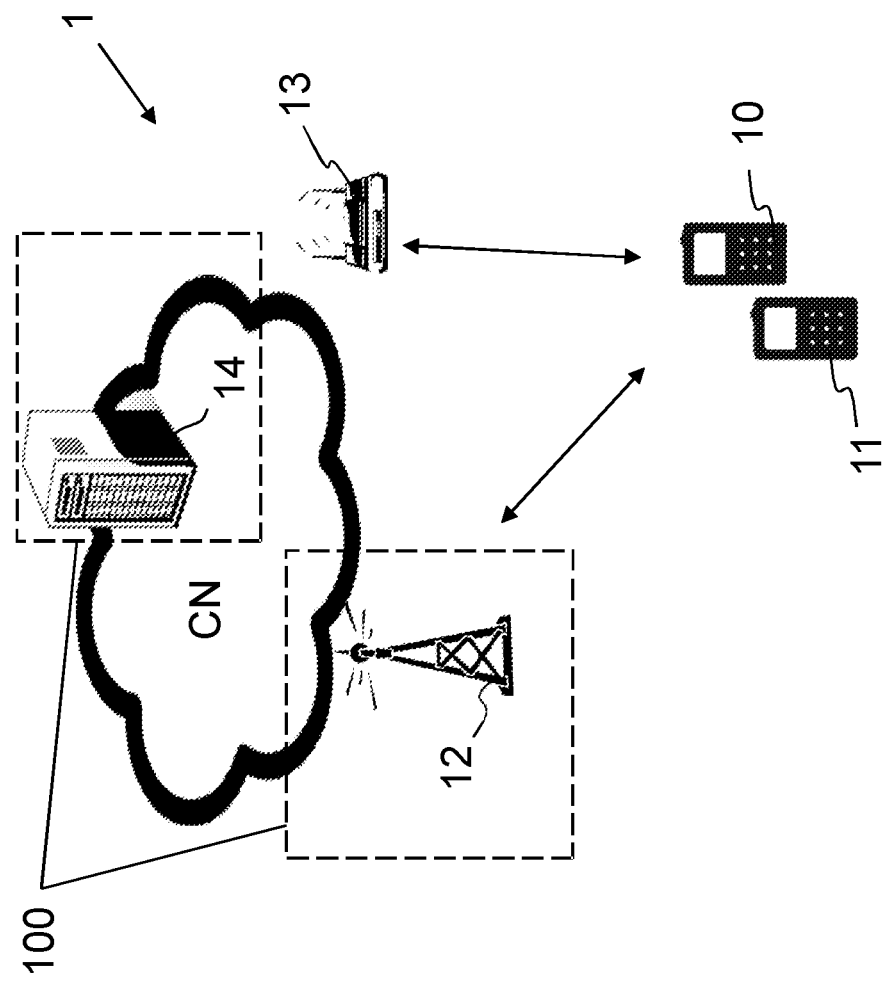
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), IEEE 802.15.4-enabled protocols such as ZigBee and IPv6 over Low power Wireless Personal Area Networks (6LoWPAN) just to mention a few possible implementations or any combination thereof.

In the wireless communication network 1, wireless devices e.g. a wireless device 10 and a second wireless device 11, such as mobile stations, communication terminals, wireless communication terminals, non-AP STAs, STAs, UEs and/or wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, gateway, mobile tablets or even a small base station communicating within a cell.

The wireless communication network 1 comprises a first radio network node 12 providing radio coverage over a geographical area of a first radio access technology (RAT), such as LTE, LTE-Advanced, WCDMA, GSM/EDGE, Wi-Fi, WiMax, UMB, ZigBee, or 6LoWPAN. The first radio network node 12 may be an Access Point (AP) such as a WLAN access point, Access Controller (AC), an AP STA, a stand-alone access point, an access node, a base station, e.g. a radio base station such as a NodeB, an evolved Node B (eNB, eNode B), a base transceiver station, Access Point Base Station, base station router, or any other network unit capable of communicating with a wireless device within the area served by the first radio network node 12 depending e.g. on the first radio access technology and terminology used.

Furthermore, the wireless communication network 1 comprises a second radio network node 13 providing radio coverage over an area of a second radio access technology operating on a same or at least partly the same spectrum range of radio resources as the first radio network node 12, e.g. LTE, LTE-Advanced, WCDMA, GSM/EDGE, Wi-Fi, WiMax, UMB, ZigBee, or 6LoWPAN. The second radio network node 13 may be an AP such as a WLAN access point, AC, an AP STA, a stand-alone access point, an access node, a base station, e.g. a radio base station such as a NodeB, an eNB, a base transceiver station, Access Point Base Station, base station router, or any other network unit capable of communicating with a wireless device within the area served by the second radio network node 13 depending e.g. on the second radio access technology and terminology used. The first and second RAT may be the same RAT or different RATs.

Radio network nodes are devices with at least one first network interface, i.e. a radio interface for connecting with wireless device clients in range. Optionally, these radio network nodes may have a second network interface, wired or wireless, for enabling communication of connected wireless devices with an external network, e.g. a Wide Area Network—WAN such as the Internet. The first network interface may also be used to communicate with other radio network nodes in range.

The wireless communication network 1 further comprise a central network node 14 such as a core network node, a network server, a cloud server, a Mobility Management Entity (MME), an Operational and Managing node or similar.

Embodiments herein provide a dynamic allocation function of radio resources, either distributed or centralized, that includes the collection of input criteria and communication, for enforcing a decision in the radio network nodes. In embodiments here a network node 100, exemplified in embodiments herein as the first radio network node 12 or the central network node 14, is provided to perform the dynamic allocation of a part or full spectrum of radio resources, e.g. allocating a channel interval of a spectrum of channels to the second radio network node 13 not overlapping a channel interval allocated to the first radio network node 12.

According to embodiments herein the network node 100 receives or obtains condition data from one or more radio network nodes, e.g. the second radio network node 13 and the first radio network node 12. Each condition data indicates a condition of the respective radio network node out of the one or more radio network nodes. For example, the condition data may comprise a load of the respective radio network node. The one or more radio network nodes providing the condition data may transmit a respective unique identity (ID) to the network node 100 enabling an identification of every radio network node in the wireless communication network 1. The network node 100 then performs an allocation of at least a part of the spectrum of radio resources to the one or more radio network nodes based on the received condition data. For example, if the load is high in the second network node 13, the network node 100 may allocate a part of the spectrum of radio resources to the second radio network node 13, which part of the spectrum does not overlap a different part of the spectrum of radio resources allocated to the first radio network node 12. The network node 100 may receive communication of data as further input to the dynamic allocation function, e.g. radio access gateway identifier, signal to noise ratio, transmit power, client throughput, and relative location of every radio network node to the rest of the radio network nodes in the wireless communication network 1. The network node 100 then transmits, e.g. to the second radio network node 13, data indicating the allocation of the at least a part of the spectrum of radio resources for the second radio network node 13. For example, the network node 100 may communicate the allocation or decision of the dynamic allocation function to every radio network node as control information. The network node 100 may use existing spectrum of radio resources to transmit this control information and piggyback on existing protocols, e.g. probe request/response frames in the case of 802.11.x.

Figure 2:
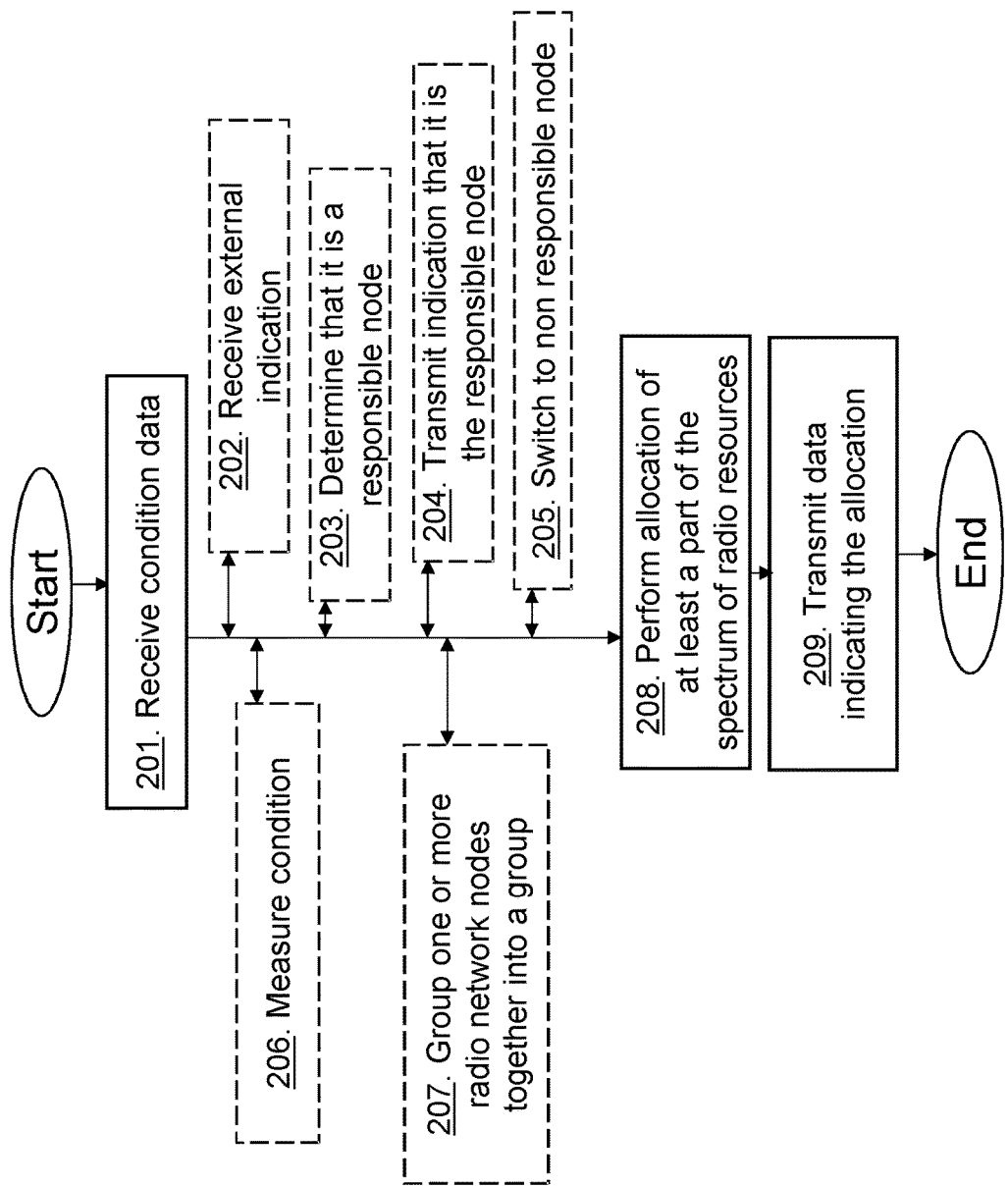
FIG. 2 shows a schematic flowchart depicting a method performed by a network node according to embodiments herein.

The method actions performed by the network node 100, exemplified as the first radio network node 12 or the central network node 14 in the figures herein, for performing allocation of at least a part of a spectrum of radio resources to one or more radio network nodes in a wireless communication network according to embodiments herein will now be described with reference to a flowchart depicted in FIG. 2. The actions do not have to be taken in the order stated below, but may be taken in any suitable order. Actions performed in some embodiments are marked with dashed boxes. The spectrum of the radio resources may comprise a spectrum of channels or a spectrum of time slots or certain time slots. The spectrum of channels may e.g. comprise channels of a licensed bandwidth, channels of an unlicensed bandwidth or a combination thereof.

Action 201. The network node 100 receives condition data from the one or more radio network nodes, wherein each condition data indicates a condition of a respective radio network node out of the one or more radio network nodes. The condition data and/or condition may comprise a radio performance, a throughput, a radio measurement, a latency data, a number of active wireless devices, an amount of noise, a kind of traffic, and/or a load of the respective radio network node. The network node 100 may receive this condition data dynamically when a rule is fulfilled at one of the radio network nodes. The network node 100 may thus receive this condition data during operation where allocation of the spectrum of radio resources has previously been performed.

Action 202. The network node 100 may receive an external indication from the second radio network node 13 that the second radio network node 13 is an additional responsible node.

Action 203. When the network node 100 is the first radio network node 12, the network node 100 may determine that the network node is a responsible node for performing the allocation. The network node 100 may determine that the network node 100 is the responsible node based on a location of the network node 100, a capacity of the network node 100, a throughput to/from the network node 100, an order of identity number, randomly, and/or the received condition data. The network node 100 may determine that the network node 100 is the responsible node by taking into account the received external indication, see action 202.

Action 204. The network node 100 may transmit an indication that the network node 100 is the responsible node.

Action 205. The network node 100 may switch to be a non-responsible node based on the received external indication from the second radio network node 13.

Action 206. When the network node 100 is the first radio network node 12, the network node 100 may measure a condition in the network node 100 e.g. load.

Action 207. The network node 100 may group the one or more radio network nodes together into a group from a plurality of radio network nodes.

Action 208. The network node 100 performs an allocation of at least a part of the spectrum of radio resources to the one or more radio network nodes based on the received condition data. The network node 100 may further take the measured condition into account when performing the allocation in addition to the received condition data. The network node 100 may further take a location of the one or more radio network nodes, an overlap of radio resources between the one or more radio network nodes, or similar into account when performing the allocation. For example, the network node 100 may change allocation of a part of the spectrum of radio resources previously allocated to e.g. the second radio network node out of the one or more radio network nodes based on a change of condition data from the second radio network node 13.

Action 209. The network node 100 transmits to the one or more radio network nodes, data indicating the allocation of the at least a part of the spectrum of radio resources for the one or more radio network nodes. When the network node 100 is the central network node 14, the network node 100 may transmit to the one or more radio network nodes data indicating the at least part of the spectrum of radio resources is performed via an intermediate radio network node.

In one first case, the first radio network node 12 and the second radio network node 13 communicate and decide to allocate wireless channels amongst themselves, thus, the first radio network node 12 being the network node 100. In another case, the first radio network node 12 and the second radio network node 13 communicate with the central network node 14 e.g. a cloud service, which central network node 14 captures all the information and makes the allocation decision, and relays this information back to the respective radio network node. Thus, the radio network nodes can either communicate between them or using the central network node 14. These two cases are illustrated in the sequence diagrams below in FIGS. 3 and 4.

Figure 3:
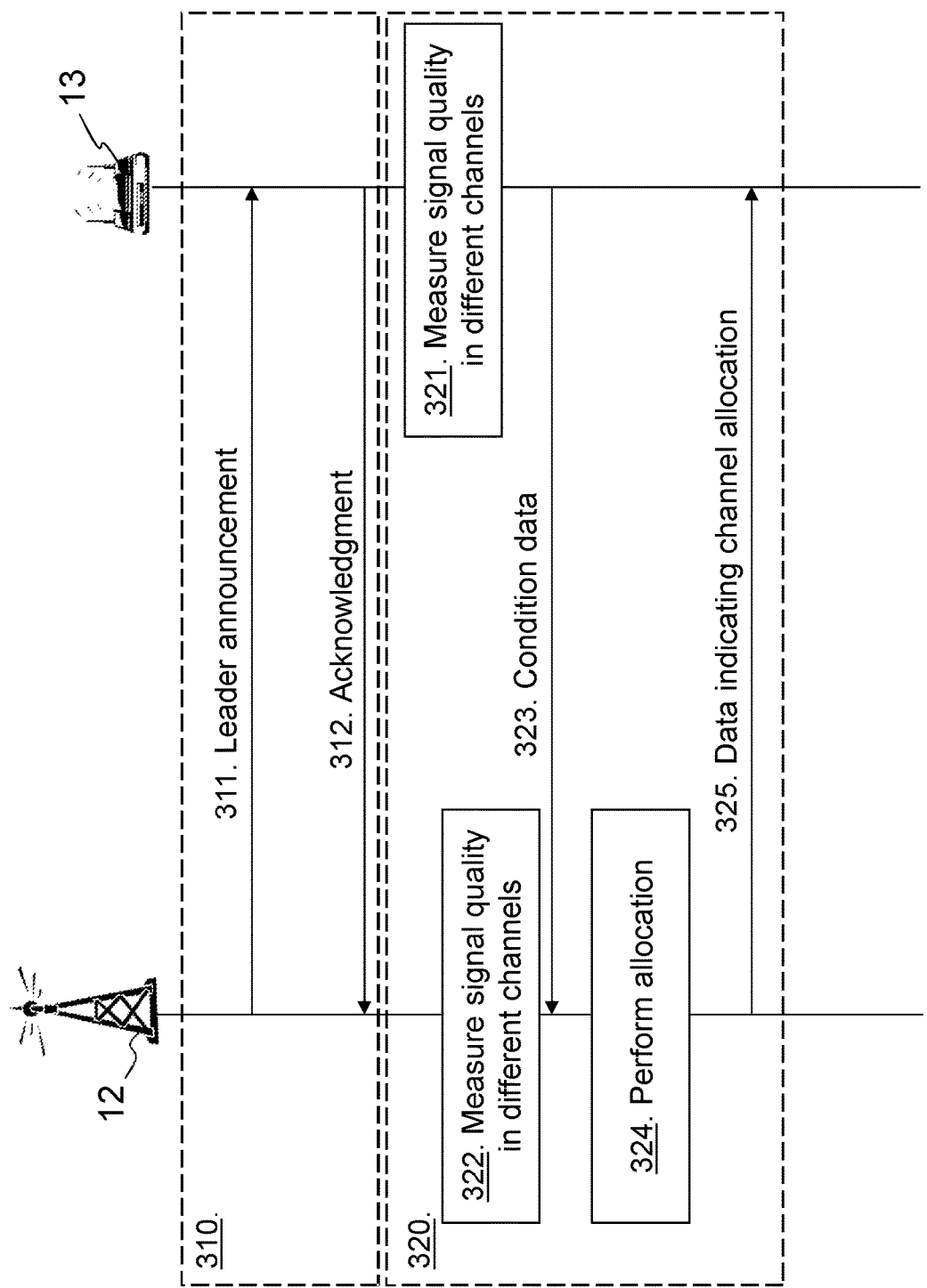
FIG. 3 is a combined signalling scheme and flowchart according to embodiments herein.

In the first case, an allocation decision may take place in one of the radio network nodes, i.e. the first radio network node 12, based on information or condition data received from all the radio network nodes in the network. The process involves two actions, as illustrated in FIG. 3 wherein the spectrum of the radio resources is exemplified as a spectrum of channels. The actions do not have to be taken in the order stated below, but may be taken in any suitable order.

Action 310. The first action involves electing one radio network node as a responsible node for the channel allocation decision. The electing process may involve a leader election algorithm, wherein all radio network nodes decide amongst themselves, which radio network node will be the responsible node. In this embodiment all radio network nodes have either direct connection to the responsible node or could be connected through multiple hops in the wireless communication network 1.

An example of a leader election algorithm is the bully election algorithm. According to this bully election algorithm, the radio network nodes in the wireless communication network are ranked by "importance", e.g. a measure of importance may be the runtime of a radio network node, i.e. how long a radio network node has been operating without interruption. When one of the radio network nodes detects that the current "leading" radio network node is down, or there is simply no leading radio network node yet, the one of the radio network nodes broadcasts an "alive" message to all the radio network nodes of higher "importance". If no radio network node responds, then the radio network node that broadcasted the "alive" message is elected the responsible node. If a radio network node of greater "importance" responds, then it waits for a new "alive" message from this radio network node and if it receives one it cancels its "candidacy" to become the responsible node. Importance may be determined by a current computational, storage and network capacity of the radio network node, which in turn is a function of (a) the hardware specifications of the radio network node in terms of processor, e.g. processor model, number of cores, clock rate per core; network, e.g. throughput, jitter, latency, and volatile memory, e.g. RAM or non-volatile memory e.g. HDD, SSD, and (b) the current load, e.g. number of active subscribers and network utilization.

For example:

Action 311. The first radio network node 12 may transmit a leader announcement to the second radio network node 13 indicating that the first radio network node 12 is the responsible node.

Action 312. The second radio network node 13 may then transmit an acknowledgement back to the first radio network node 12 confirming that the first radio network node 12 is the responsible node.

Action 320. The first radio network node 12 being the elected responsible node performs channel allocation of at least a part of the channel spectrum for the respective radio network node. The decision process for channel allocation itself is not described herein as there is quite enough literature covering it in the state of art and is contextual, depending on the domain of application of radio network node connectivity. Criteria that may be relevant are the signal to noise ratios (SNRs) per channel for every radio network node, their capacity, number of wireless devices currently associated and active sessions, etc.

The decision process is independent of the leader election algorithm and radio network nodes may send network data, e.g. SNR readings, active sessions, number of associated devices, etc., to the first radio network node 12 being the responsible node periodically, or only send network data when there is a change in the network data from previous readings. There can be a few cases when there is a change in the network data:

Introduction of a new radio network node to the network, or decommissioning of a radio network node from the network, quite common with mobile hotspots, for example, smartphones using tethering feature.

One or more devices associating/disassociating from a radio network node or environmental effects, e.g. rain, humidity, may also cause a change in the network data.

For example:

Action 321. The second radio network node 13 may measure signal quality in different channels indicating a load at the second radio network node 13. Hence, the second radio network node 13 may measure the condition at the second radio network node 13.

Action 322. Also the first radio network node 12 may measure signal quality in different channels indicating a load at the second radio network node. Hence, the first radio network node 12 may measure the condition at the first radio network node 12. This is an example of action 206 in FIG. 2 above.

Action 323. The second radio network node 13 may then transmit condition data e.g. the load of the second radio network node 13.

Action 324. The first radio network node 12 then performs an allocation of radio resources or a part of a spectrum of radio resources such as channels for the second radio network node 13 and in some embodiments also for the first radio network node 12. This is an example of action 208 in FIG. 2 above.

Action 325. The first radio network node 12 then transmits, to the second radio network node 13, data indicating the channel allocation for the second radio network node 13. This is an example of action 209 in FIG. 2 above.

All radio network nodes have a respective unique ID which may be set identical to a Media Access Control (MAC) address or it can be a result of a function that takes into account the current processing, storage and network capacity of the radio network node, as described previously.

In a second embodiment, radio network nodes delegate the decision for allocation of the spectrum of radio resources to an external entity, e.g. a "cloud service" on the Internet or other external network, the external entity being exemplified herein as the central network node 14. Unlike the previous case, this setup requires no voting and election of a responsible node or a leader node, but may have specific requirements on a network link quality between the radio network nodes and the "cloud service", i.e. the central network node 14, depending on the use case.

Note that as in this case, the radio network nodes, e.g. the first and second radio network nodes, may send network quality data, e.g. SNR, number of associated devices, active sessions, to the cloud service either periodically, or when they detect a change in this data from previous readings.

Figure 4:
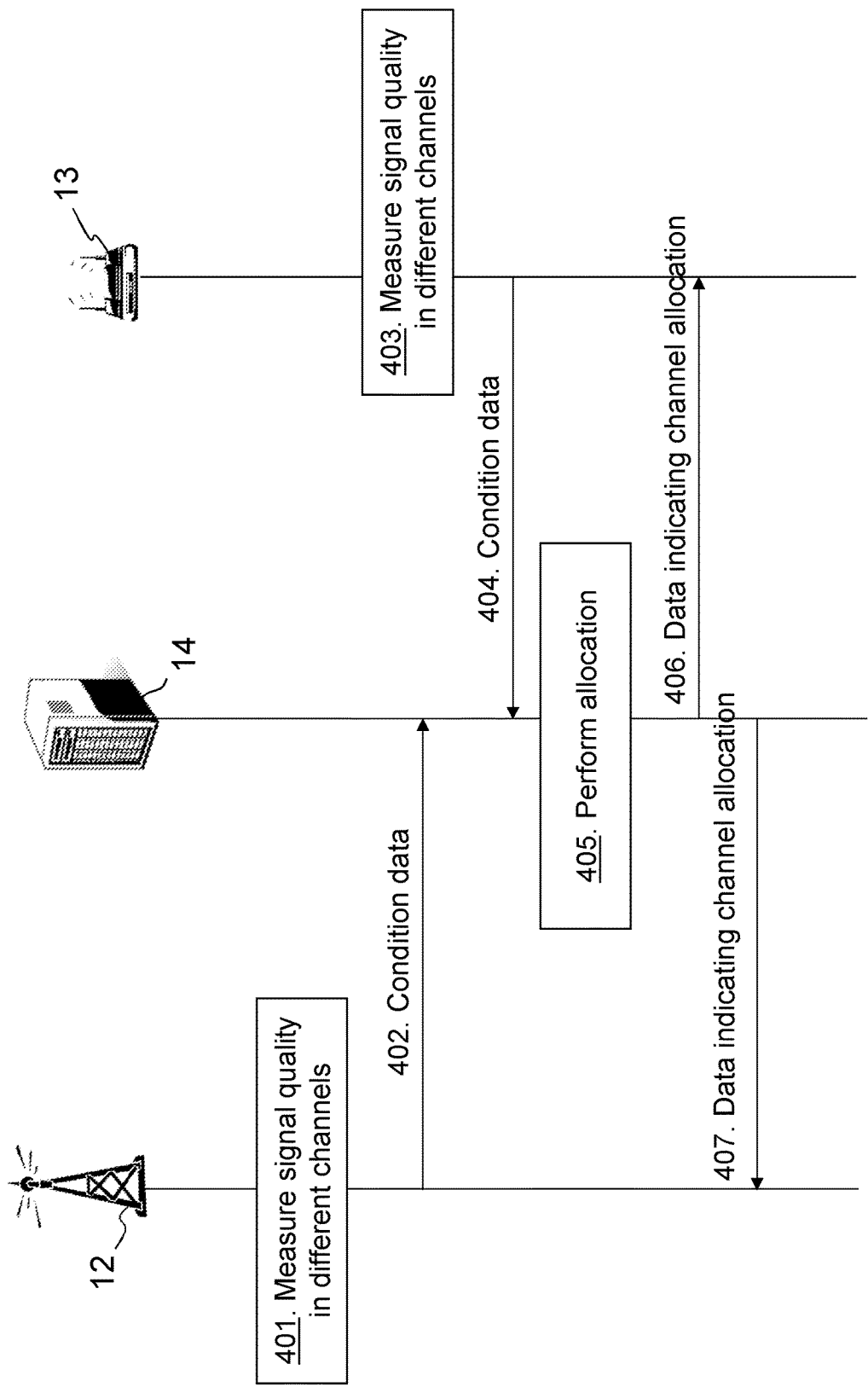
FIG. 4 is a combined signalling scheme and flowchart according to embodiments herein.

This is illustrated in FIG. 4 showing the central network node 14 being an example of the network node for performing allocation of a part of e.g. a channel spectrum to the first and second radio network nodes in the wireless communication network 1. The actions do not have to be taken in the order stated below, but may be taken in any suitable order.

Action 401. The first radio network node 12 may measure signal quality in different channels indicating a load at the second radio network node. Hence, the first radio network node 12 may measure the condition at the first radio network node 12.

Action 402. The first radio network node 12 may then transmit condition data e.g. the load of the first radio network node 12, to the central network node 14.

Action 403. The second radio network node 13 may measure signal quality in different channels indicating a load at the second radio network node 13. Hence, the second radio network node 13 may measure the condition at the second radio network node 13.

Action 404. The second radio network node 13 may then transmit condition data e.g. the load of the second radio network node 13, to the central network node 14.

Action 405. The central network node 14 may further perform an allocation of a part of the channel spectrum to both the first radio network node 12 and the second radio network node 13 taking the received condition data into account. This is an example of action 208 in FIG. 2 above.

Action 406. The central network node 14 may then transmit, to the second radio network node 13, data indicating channel allocation for the second radio network node 13. This is an example of action 209 in FIG. 2 above.

Action 407. The central network node 14 may then transmit, to the first radio network node 12, data indicating channel allocation for the first radio network node 12. This is an example of action 209 in FIG. 2 above.

In another embodiment existence of multiple leaders or responsible nodes in the wireless communication network 1 is allowed. Each leader manages channel selection for all devices in a group of subordinate radio network nodes, thus, the first radio network node 12 may group one or more radio network node into a group as stated above in action 207. In each group there is only one responsible node. While in each group a connectivity to the responsible node is required, existence of multiple responsible nodes and groups, makes fulfilment of that requirement feasible for a wireless communication network of arbitrary size.

Figure 5:
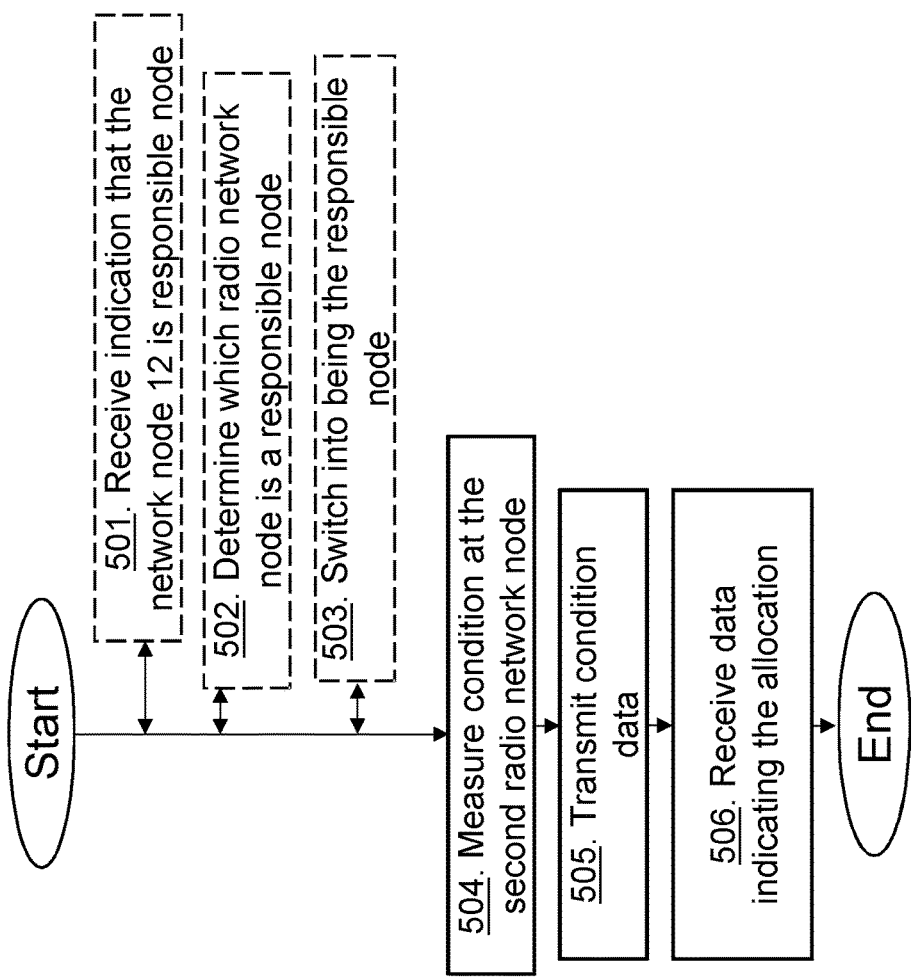
FIG. 5 is a schematic flowchart depicting a method performed by a second radio network node according to embodiments herein.

Embodiments describe methods and a system for communication of network quality data between radio network nodes e.g. base stations, access points, etc. that use the same spectrum range, for the purpose of using this information to decide on allocating different parts of this spectrum in an efficient way so as to mitigate interference across associated devices. The method actions performed by the second radio network node 13 for receiving an allocation of at least a part of a spectrum of radio resources from the network node in the wireless communication network 1 according to some embodiments will now be described with reference to a flowchart depicted in FIG. 5. The actions do not have to be taken in the order stated below, but may be taken in any suitable order. Actions performed in some embodiments are marked with dashed boxes.

Action 501. The second radio network node 13 may receive an indication that the network node 12 is a responsible node for performing the allocation of the at least a part of the spectrum of radio resources.

Action 502. The second radio network node 13 may determine which radio network node out of a number of radio network nodes is a responsible node for performing the allocation of the at least a part of the spectrum of radio resources. In some embodiments the second radio network node 13 determines which radio network node out of the number of radio network nodes is the responsible node by taking the received indication into account, see action 501.

Action 503. The second radio network node 13 may switch the second radio network node 13 into being the responsible node when a criterion is fulfilled. E.g. if no leader is active around, plus e.g. some random time period has passed, the criterion is fulfilled and the second radio network node 13 switches to a responsible node. Randomization of time period may be needed in order to prevent all radio network nodes declaring themselves a leader at the same time once old leader shut down.

Action 504. The second radio network node 13 measures a condition at the second radio network node 13, e.g. load or throughput.

Action 505. The second radio network node 13 transmits condition data, wherein the condition data indicates the measured condition of the second radio network node. The second radio network node 13 may transmit the condition data directly to the network node 100 or via an intermediate radio network node. In some examples, the second radio network node 13 may transmit condition data dynamically when a rule is fulfilled. The rule may define that when thresholds in load are exceeded or changes of operation data are above a threshold the rule is fulfilled and the second radio network node 13 should transmit condition data, e.g. if the weather suddenly changes affecting the throughput in the second radio network node 13, the second radio network node 13. The second radio network node 13 may further transmit, forward, additional data indicating that the network node 100 is the responsible node. The second radio network node 13 may further transmit a unique identity of the second radio network node 13 to the network node 100.

Action 506. The second radio network node 13 receives from the network node 100, directly from the network node 100 or via an intermediate radio network node, data indicating the allocation of the at least a part of the spectrum of radio resources for the radio network node 13.

The second radio network node 13 may then communicate with wireless devices within coverage of the second radio network node 13 using the part or full spectrum of radio resources as indicated by the received data.

Embodiments herein enable a higher throughput for associated wireless devices as embodiments herein provide a smarter allocation of e.g. non-overlapping areas of spectrum of radio resources to radio network stations. Hence, multiple operators can share the same spectrum of radio resources more efficiently.

All radio network nodes may be in one of two possible states of operation: Leader and Non-leader or responsible node or non-responsible node. Once a radio network node is turned on it is set to non-leader state. Non-leader keeps track of the leader ID of its group in local variable association_leader_ID. Upon switching on of a device association_leader_ID variable in it is set empty. Devices in Leader state periodically broadcast I_am_a_leader_message with predefined period of time herein called Leader_Announcement_ Period. If a radio network node in a non-leader state, e.g. the second radio network node 13, receives no I_am_a_leader_message for a longer time than Leader_Announcement_Period then the second radio network node 13 may switch to a Leader state.

Below are algorithms running in a respective radio network node depending on their state:
Non-leader state, e.g. the second radio network node 13 being in a non-leader state:
- Upon receive of I_am_a_leader_message from a leader, e.g. from the first radio network node 12.
- if association_leader_ID is empty then make association with that leader, e.g. the first radio network node 12, by assigning received ID of the first radio network node 12 to association_leader_ID
- Send back information about channel quality, SNR, load, etc. of the second radio network node 13. Also association bit is sent which is set to true if the second radio network node 13 is association with the first radio network node 12, false otherwise. Note that the information is sent both to leaders of the group where the second radio network node 13 belongs to and to any other leaders whose messages reaches the second radio network node 13.

Upon receive of channel selection instructions from the leader, e.g. the first radio network node 12, the second radio network node 13 applies the channel selection instructions.

After Leader_Announcement_Period time is elapsed since last arrival of I_am_a_leader_message from association_leader_ID, the association_leader_ID is resent empty. Thus, the old leader is considered to be lost Search for leader, e.g. part of non-leader daemon:

The second radio network node 13 may switch to Leader state if association_leader_ID stays empty for longer than Leader_Announcement_Period, i.e. no leader is active around, plus some random time period, randomization is needed in order to prevent all devices declaring themselves a leader at the same time once old leader shut down.

Leader state, e.g. the first radio network node 12 being in a leader state:

Periodically, with predefined Leader_Announcement_Period, broadcast I_am_a_leader_message with the ID of the first radio network node 12, e.g. MAC address.

Upon receiving all responses from radio network nodes the first radio network node 12 makes allocation of channels to all associated subordinates, i.e. other radio network nodes, and use channel information both from subordinates and radio network nodes associated with other leaders;

Send allocation information to all subordinates, radio network nodes associated with other leaders are managed by their leaders;

Upon receiving an I_am_a_leader_message from another leader, unlikely even that might occur if two radio network nodes in neighborhood nearly simultaneously switch to leader state. Compare ID in the message with own ID. If own ID is larger or more important than received ID discard received message, otherwise reset to a non-leader state and assign received ID to association_leader_ID variable. Interpretation of relative importance of the IDs depends on what the ID represents. If the ID is simply the MAC address, then one ID could be more important than the other simply if the integer representation of a first MAC address is a larger number than the integer representation of a latter, e.g. an ASCII table may be used to convert MAC addresses to integers. This method may be more suitable to be used in wireless communication networks where all nodes have the same hardware specifications and manage roughly the same number of subscribers. If the ID represents the current "capacity index" of a node, and assuming that larger capacity index indicates greater ability to serve as a leader because of more available processing/network/storage capacity, then greater importance is the case where a capacity index of radio network node A is larger than a capacity index of a radio network node B.

In order to perform the methods disclosed herein a network node and a second radio network node are provided herein.

Figure 6:
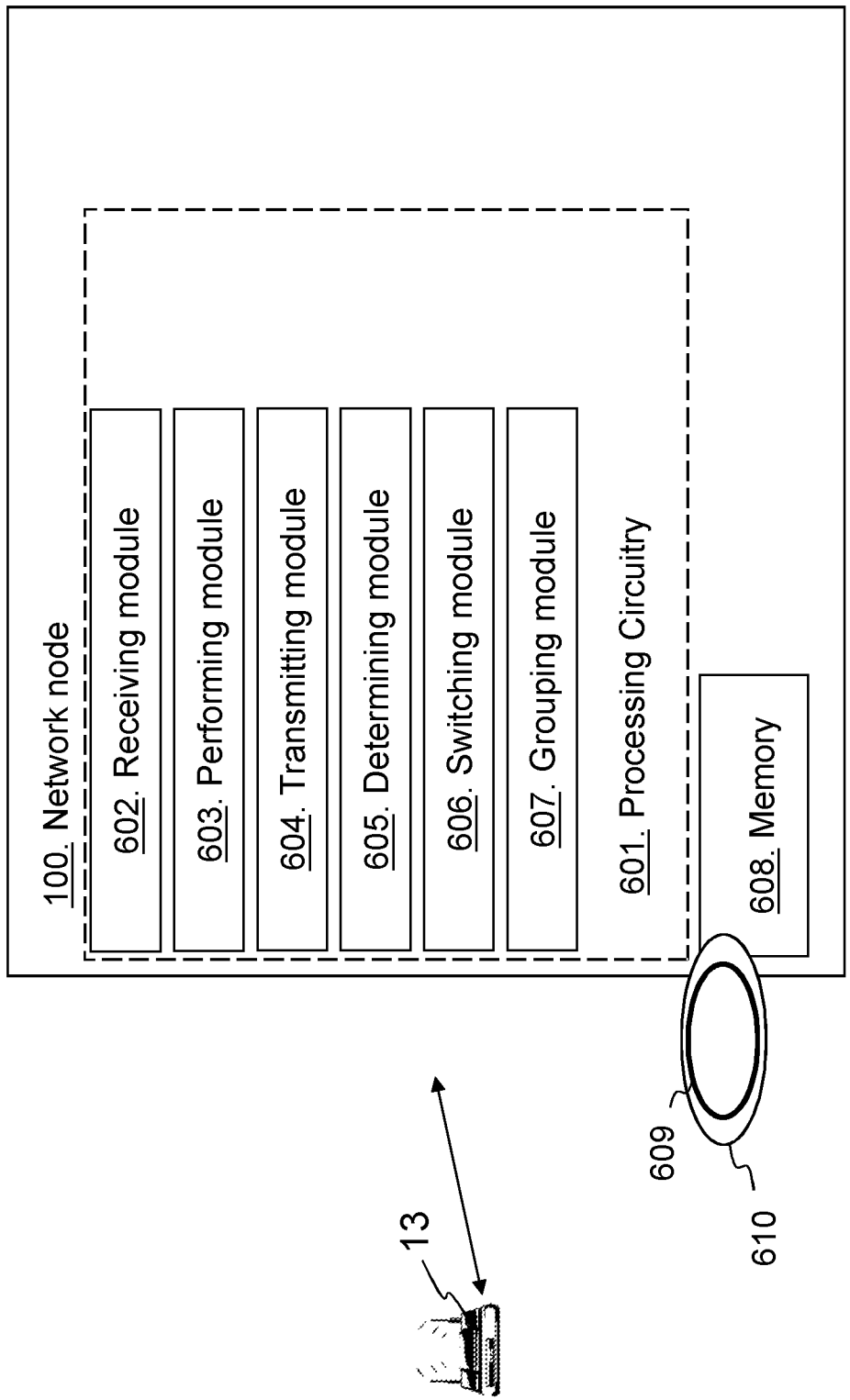
FIG. 6 is a block diagram depicting a network node according to embodiments herein.

FIG. 6 is a block diagram depicting the network node 100 for performing allocation of at least a part of a spectrum of radio resources to one or more radio network nodes in the wireless communication network 1 according to embodiments herein.

The network node 100 is configured to receive condition data from the one or more radio network nodes, wherein each condition data indicates a condition of a respective radio network node out of the one or more radio network nodes.

The network node 100 is configured to perform an allocation of at least a part of the spectrum of radio resources to the one or more radio network nodes based on the received condition data.

The network node 100 is configured to transmit to the one or more radio network nodes, data indicating the allocation of the at least a part of the spectrum of radio resources for the one or more radio network nodes.

In some embodiments the network node 100 may be the first radio network node 12. Then, the network node 100 may further be configured to determine that the network node 100 is a responsible node for performing the allocation. The network node 100 may e.g. be configured to determine that the network node 100 is the responsible node based on a location of the network node, a capacity of the network node, a throughput to/from the network node, an order of identity number, randomly, and/or the received condition data. Then, the network node 100 may further be configured to transmit an indication that the network node 100 is the responsible node. The network node 100 may further be configured to receive an external indication from the second radio network node 13 that the second radio network node 13 is an additional responsible node. Then, the network node may be configured to take the received external indication into account when determining that the network node 100 is the responsible node. Furthermore, the network node 100 may be configured to switch to be a non-responsible node based on the received external indication from the second radio network node 13. The network node 100 may be configured to measure a condition in the network node 100, and to be configured to take the measured condition into account when performing the allocation in addition to the received condition data.

The network node 100 may additionally or alternatively be the central network node 14.

The network node 100 may be configured to transmit to the one or more radio network nodes, data indicating the at least part of the spectrum of radio resources, via an intermediate radio network node.

The network node 100 may be configured to group the one or more radio network nodes together into a group from a plurality of radio network nodes.

The network node 100 may be configured to further take a location of the one or more radio network nodes, or an overlap of radio resources between the one or more radio network nodes into account when performing the allocation.

The spectrum of the radio resources comprises a spectrum of channels. The spectrum of channels may comprise channels of a licensed bandwidth, channels of an unlicensed bandwidth or a combination thereof. The condition data and/or condition may comprise a radio performance, a throughput, a radio measurement, a latency data, a number of active wireless devices, an amount of noise, a kind of traffic, and/or a load of the respective radio network node.

The network node 100 may comprise processing circuitry 601 arranged to perform the methods described herein.

The network node 100 may comprise a receiving module 602. The processing circuitry 601 and/or the receiving module 602 may be configured to receive condition data from the one or more radio network nodes, wherein each condition data indicates a condition of a respective radio network node out of the one or more radio network nodes.

The network node 100 may comprise a performing module 603. The processing circuitry 601 and/or the performing module 603 may be configured to perform an allocation of at least a part of the spectrum of radio resources to the one or more radio network nodes based on the received condition data.

The network node 100 may comprise a transmitting module 604. The processing circuitry 601 and/or the transmitting module 604 may be configured to transmit to the one or more radio network nodes, data indicating the allocation of the at least a part of the spectrum of radio resources for the one or more radio network nodes.

In some embodiments the network node 100 may be the first radio network node 12. The network node 100 may comprise a determining module 605. The processing circuitry 601 and/or the determining module 605 may then be configured to determine that the network node 100 is a responsible node for performing the allocation. The processing circuitry 601 and/or the determining module 605 may e.g. be configured to determine that the network node 100 is the responsible node based on a location of the network node 100, a capacity of the network node 100, a throughput to/from the network node 100, an order of identity number, randomly, and/or the received condition data.

The processing circuitry 601 and/or the transmitting module 604 may be configured to transmit an indication that the network node 100 is the responsible node.

The processing circuitry 601 and/or the receiving module 602 may be configured to receive an external indication from the second radio network node 13 that the second radio network node 13 is an additional responsible node. The processing circuitry 601 and/or the determining module 605 may then be configured to take the received external indication into account when determining that the network node 100 is the responsible node.

Furthermore, the network node 100 may comprise a switching module 606. The processing circuitry 601 and/or the switching module 606 may then be configured to switch the network node 100 to be a non-responsible node based on the received external indication from the second radio network node 13.

Furthermore, the network node 100 may comprise a measuring module 607. The processing circuitry 601 and/or the measuring module 607 may be configured to measure a condition in the network node 100. The processing circuitry 601 and/or the performing module 603 may then be configured to take the measured condition into account when performing the allocation in addition to the received condition data.

The network node 100 may additionally or alternatively be the central network node 14.

The processing circuitry 601 and/or the transmitting module 604 may be configured to transmit to the one or more radio network nodes, data indicating the at least part of the spectrum of radio resources, via an intermediate radio network node.

The network node 100 may comprise a grouping module 608. The processing circuitry 601 and/or the grouping module 608 may be configured to group the one or more radio network nodes together into a group from a plurality of radio network nodes.

The processing circuitry 601 and/or the performing module 603 may be configured to further take a location of the one or more radio network nodes, or an overlap of radio resources between the one or more radio network nodes into account when performing the allocation.

The network node 100 further comprises a memory 609. The memory comprises one or more units to be used to store data on, such as spectrum of radio resources, condition data, condition, radio network node IDs, applications to perform the methods disclosed herein when being executed, and similar.

The methods according to the embodiments described herein for the network node 100 may be implemented by means of e.g. a computer program 610 or a computer program product, comprising instructions, i.e., software code portions, which, when executed on at least one processor, cause the at least one processor to carry out the actions described herein, as performed by the network node 100. The computer program 610 may be stored on a computer-readable storage medium 611, e.g. a disc or similar. The computer-readable storage medium 611, having stored thereon the computer program, may comprise the instructions which, when executed on at least one processor, cause the at least one processor to carry out the actions described herein, as performed by the network node 100. In some embodiments, the computer-readable storage medium may be a non-transitory computer-readable storage medium.

Figure 7:
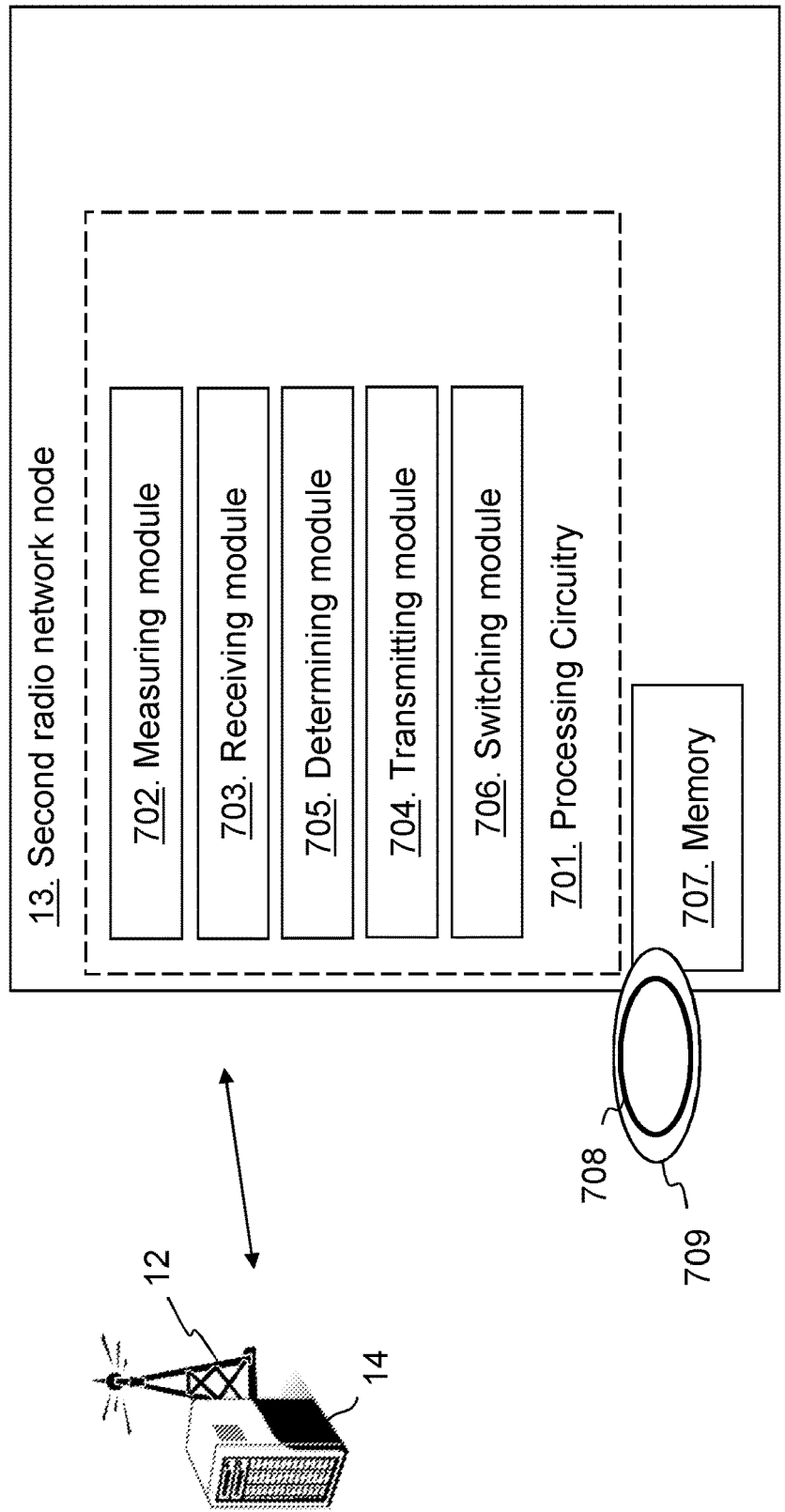
FIG. 7 is a block diagram depicting a second radio network node according to embodiments herein.

FIG. 7 is a block diagram depicting the second network node 13 for receiving an allocation of at least a part of a spectrum of radio resources from a network node 100 in a wireless communication network 1.

The second radio network node 13 is configured to measure a condition at the second radio network node 13.

The second radio network node 13 is configured to transmit condition data to the network node 100, wherein the condition data indicates the measured condition of the second radio network node.

The second radio network node 13 is configured to receive from the network node, data indicating the allocation of the at least a part of the spectrum of radio resources for the radio network node 13.

The second radio network node 13 may further be configured to determine which radio network node out of a number of radio network nodes is a responsible node for performing the allocation of the at least a part of the spectrum of radio resources.

The second radio network node 13 may further be configured to receive an indication that the network node 12 is a responsible node for performing the allocation of the at least a part of the spectrum of radio resources, and to take the received indication into account when determining which radio network node out of the number of radio network nodes is the responsible node.

The second radio network node 13 may further be configured to transmit additional data indicating that the network node is the responsible node.

The second radio network node 13 may further be configured to switch the second radio network node 13 into being the responsible node when a criterion is fulfilled.

The second radio network node 13 may further be configured to transmit the condition data dynamically when a rule is fulfilled.

The second radio network node 13 may further be configured to transmit the condition data and/or to receive data from the network node 100 directly to/from the network node 100 or via an intermediate radio network node.

The second radio network node 13 may further be configured to transmit a unique identity of the second radio network node 13 to the network node 100.

The second radio network node 13 may comprise processing circuitry 701 arranged to perform the methods described herein.

The second radio network node 13 may comprise a measuring module 702. The processing circuitry 701 and/or the measuring module 702 may be configured to measure a condition at the second radio network node 13.

The second radio network node 13 may comprise a transmitting module 703. The processing circuitry 701 and/or the transmitting module 703 may be configured to transmit condition data to the network node 100, wherein the condition data indicates the measured condition of the second radio network node.

The second radio network node 13 may comprise a receiving module 704. The processing circuitry 701 and/or the receiving module 704 may be configured to receive from the network node, data indicating the allocation of the at least a part of the spectrum of radio resources for the radio network node 13.

The second radio network node 13 may comprise a determining module 705. The processing circuitry 701 and/or the determining module 705 may be configured to determine which radio network node out of a number of radio network nodes is a responsible node for performing the allocation of the at least a part of the spectrum of radio resources.

The processing circuitry 701 and/or the receiving module 704 may be configured to receive an indication that the network node 12 is a responsible node for performing the allocation of the at least a part of the spectrum of radio resources, and the processing circuitry 701 and/or the determining module 705 may be configured to take the received indication into account when determining which radio network node out of the number of radio network nodes is the responsible node.

The processing circuitry 701 and/or the transmitting module 703 may be configured to transmit additional data indicating that the network node is the responsible node.

The second radio network node 13 may comprise a switching module 706. The processing circuitry 701 and/or the switching module 706 may be configured to switch the second radio network node 13 into being the responsible node when a criterion is fulfilled.

The processing circuitry 701 and/or the transmitting module 703 may be configured to transmit the condition data dynamically when a rule is fulfilled.

The processing circuitry 701 and/or the transmitting module 703 may be configured to transmit the condition data, and/or the processing circuitry 701 and/or the receiving module 704 may be configured to receive data from the network node 100, directly to/from the network node 100 or via an intermediate radio network node.

The processing circuitry 701 and/or the transmitting module 703 may be configured to transmit a unique identity of the second radio network node 13 to the network node 100.

The second radio network node 13 further comprises a memory 707. The memory comprises one or more units to be used to store data on, such as spectrum of radio resources, part of the spectrum of radio resources allocated to the second radio network node 13, condition data, condition, radio network node ID, applications to perform the methods disclosed herein when being executed, and similar.

The methods according to the embodiments described herein for the second radio network node 13 may be implemented by means of e.g. a computer program 708 or a computer program product, comprising instructions, i.e., software code portions, which, when executed on at least one processor, cause the at least one processor to carry out the actions described herein, as performed by the second radio network node 13. The computer program 708 may be stored on a computer-readable storage medium 709, e.g. a disc or similar. The computer-readable storage medium 709, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. Transmitting modules and receiving modules may be transmitters, receivers or transceivers.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a radio network node, the method comprising:
   executing a leader election algorithm, wherein the radio network node is one among a plurality of radio network nodes sharing the same radio spectrum according to a defined set of frequency channels, and wherein the leader election algorithm comprises engaging in inter-node communications with the other radio network nodes in the plurality, to identify a leader node; and
   responsive to election of the radio network node as the leader node:
      transmitting a leader announcement via an inter-node communication interface, to apprise the other radio network nodes in the plurality that the radio network node is the leader node, the other radio network nodes being subordinate nodes with respect to the leader node;
      obtaining information from each subordinate node, the information indicating radio conditions and loading at the subordinate node;
      determining respective channel allocations for the subordinate nodes, from among the defined set of frequency channels, in dependence on the information obtained from each subordinate node, the respective channel allocations mitigating interference among the subordinate nodes or their corresponding served wireless devices; and transmitting indications of the respective channel allocations to the subordinate nodes.

2. The method of claim 1, wherein determining the respective channel allocations comprises allocating a non-overlapped subset of frequency channels from the defined set of frequency channels, for any given subordinate node experiencing a high loading, as indicated by the information obtained for the given subordinate node.

3. The method of claim 1, wherein determining the respective channel allocations comprises preventing overlapping channel allocations between respective ones of the subordinate nodes that are neighboring in terms of location.

4. The method of claim 1, further comprising terminating operation as the leader node in response to determining, according to a defined scheme for ranking importance, that a more important radio network node is indicating its operation as a new leader node, the more important radio network node being one among the plurality of radio network nodes previously operating as the subordinate nodes or being a further radio network node not previously numbered among the plurality of radio network nodes.

5. The method of claim 4, further comprising, responsive to terminating operation as the leader node, transitioning to operation as a subordinate node, and, while operating as a subordinate node, receiving a respective channel allocation from the new leader node and restricting channel usage to the frequency channels included in the respective channel allocation.

6. A radio network node comprising:
an inter-node communication interface configured to communicatively couple the radio network node to one or more other radio network nodes; and
processing circuitry operatively associated with the communication interface and, when the radio network node operates as one among a plurality of radio network nodes sharing the same radio spectrum according to a defined set of frequency channels, configured to:
execute a leader election algorithm, wherein the leader election algorithm comprises engaging in inter-node communications with the other radio network nodes in the plurality, to identify a leader node; and
responsive to election of the radio network node as the leader node:
transmit a leader announcement, to apprise the other radio network nodes in the plurality that the radio network node is the leader node, the other radio network nodes being subordinate nodes with respect to the leader node;
obtain information from each subordinate node, the information indicating radio conditions and loading at the subordinate node;
determine respective channel allocations for the subordinate nodes, from among the defined set of frequency channels, in dependence on the information obtained from each subordinate node, the respective channel allocations mitigating interference among the subordinate nodes or their corresponding served wireless devices; and
transmit indications of the respective channel allocations to the subordinate nodes.

7. The radio network node of claim 6, wherein, for determining the respective channel allocations, the processing circuitry is configured to allocate a non-overlapped subset of frequency channels from the defined set of frequency channels, for any given subordinate node experiencing a high loading, as indicated by the information obtained for the given subordinate node.

8. The radio network node of claim 6, wherein, for determining the respective channel allocations, the processing circuitry is configured to prevent overlapping channel allocations between respective ones of the subordinate nodes that are neighboring in terms of location.

9. The radio network node of claim 6, wherein the processing circuitry is configured to terminate operation of the radio network node as the leader node, in response to determining, according to a defined scheme for ranking importance, that a more important radio network node is indicating its operation as a new leader node, the more important radio network node being one among the plurality of radio network nodes previously operating as the subordinate nodes or being a further radio network node not previously numbered among the plurality of radio network nodes.

10. The radio network node of claim 9, wherein, responsive to terminating operation of the radio network node as the leader node, the processing circuitry is configured to transition the radio network node to operation as a subordinate node, and, while the radio network node operates as a subordinate node, receive a respective channel allocation from the new leader node and restrict channel usage by the radio network node to the frequency channels included in the respective channel allocation.

* * * * *